United States Patent
Pardoen

(10) Patent No.: US 6,583,609 B1
(45) Date of Patent: Jun. 24, 2003

(54) AUTOMATIC BANDWIDTH AND STABILITY CONTROL FOR SWITCHED PULSE WIDTH MODULATION VOLTAGE REGULATOR

(75) Inventor: Matthijs D. Pardoen, Sunnyvale, CA (US)

(73) Assignee: Integration Associates Inc., Mountain View, CA (US)

(*) Notice: Subject to any disclaimer, the term of this patent is extended or adjusted under 35 U.S.C. 154(b) by 0 days.

(21) Appl. No.: 10/137,138

(22) Filed: May 1, 2002

Related U.S. Application Data

(60) Provisional application No. 60/287,917, filed on May 1, 2001.

(51) Int. Cl.$^7$ .................................................. G05F 1/56
(52) U.S. Cl. ........................................ 323/283; 323/284
(58) Field of Search ................................ 323/271, 282, 323/283, 284, 285, 286

(56) References Cited

U.S. PATENT DOCUMENTS

| | | | | |
|---|---|---|---|---|
| 5,646,513 A | * | 7/1997 | Riggio | 323/285 |
| 5,889,393 A | * | 3/1999 | Wrathall | 323/282 |
| 6,066,943 A | * | 5/2000 | Hastings et al. | 323/285 |
| 6,304,067 B1 | * | 10/2001 | Wrathall | 323/282 |
| 6,373,233 B2 | * | 4/2002 | Bakker et al. | 323/282 |

* cited by examiner

Primary Examiner—Jeffrey Sterrett
(74) Attorney, Agent, or Firm—Vernon W. Francissen; Gardner Carton & Douglas LLC

(57) ABSTRACT

One aspect of the present invention detects an equivalent series resistance (ESR) of an external capacitor and adjusts a transfer function of a feedback loop of the voltage regulator to compensate for the ESR. The ESR is detected by measuring a phase shift in a ripple voltage signal of an output voltage of the voltage regulator. Based upon the measured phase shift, an adjustable capacitance is introduced to the feedback loop to compensate for the ESR by introducing a zero to the transfer function to stabilize the voltage regulator circuit. Another aspect of the present invention is to adjust the transfer function of the feedback loop to improve transient response. By measuring both the phase shift and the amplitude of the ripple voltage signal, a gain and the position of a pole in the transfer function of the feedback loop may be adjusted to improve the transient response.

22 Claims, 8 Drawing Sheets

AUTOMATIC BANDWIDTH AND STABILITY CONTROL FOR SWITCHED PULSE WIDTH MODULATION VOLTAGE REGULATOR

RELATED APPLICATION

This application claims priority to U.S. patent application No. 60/287,917 entitled AUTOMATIC BANDWIDTH AND STABILITY CONTROL FOR SWITCHED PULSE WIDTH MODULATOR POWER CONVERTER filed May 1, 2001, herein incorporated by reference in its entirety.

FIELD OF THE INVENTION

The present invention relates to switching voltage regulators. More specifically, it relates to stability control of a switching voltage regulator.

BACKGROUND OF THE INVENTION

Pulse width modulated (PWM) voltage regulators are used to convert power from one voltage level to a second voltage level. A Buck voltage regulator typically operates by switching from a first voltage level to a second voltage level that is lower than the first voltage level. FIG. 1 illustrates an embodiment of a Buck regulator topology. Another regulator topology is used to obtain a boost converter that boosts the first voltage level to a second voltage level that is higher than the first voltage level. Still another topology is used to obtain a Buck-boost regulator that may convert the first voltage level to a second voltage level that is either higher or lower than the first voltage level. See Mitchell, *DC-DC Switching Regulator Analysis,* Bloom Associates, 1999, herein incorporated by reference in its entirety, for further background information regarding switching regulator design.

Switching regulators are highly efficient at converting from one voltage power level to another voltage power level. However, as described in Mitchell, switching regulators also require careful circuit design to obtain stability. One approach to stability is tuning of the circuit by a technician, which raises the cost of the product. Another approach is to specify external components having narrow tolerances, which leads to higher component cost. Also, the characteristics of components can change over time due to aging resulting in degradation of the stability of the converter circuit.

SUMMARY OF THE INVENTION

An embodiment of a control circuit for a switching voltage regulator circuit, according to the present invention, includes a measuring circuit having a first input terminal coupled to an output terminal of the switching voltage regulator circuit and a second input terminal coupled to an output of a switch drive circuit of the switching voltage regulator circuit. The measuring circuit is configured to generate a phase difference signal responsive to an output voltage signal at the output terminal of the switching voltage regulator circuit and an output signal of the switch drive circuit. The control circuit also includes a transfer function control circuit having a first input terminal for receiving the phase difference signal, the transfer function control circuit being configured to generate a transfer function control signal responsive to the phase difference signal such that the transfer function control signal causes at least one of a first zero or pole to be introduced to a transfer function of a voltage control feedback loop of the switching voltage regulator circuit. A variable characteristic element is disposed in the current control feedback loop and has a variable characteristic that varies responsive to the transfer function control signal. In a further refinement of this embodiment, the measuring circuit includes a first strip section having an input terminal coupled to the first input terminal of the measuring circuit, where the first strip section is configured to generate a measured phase signal in response to the output voltage signal. The measuring circuit also includes a second strip section having an input terminal coupled to the second input terminal of the measuring circuit, where the second strip section is configured to generate a reference signal responsive to a signal at the output of the switch drive circuit. A multiplier receives and multiplies the measured phase signal and the reference signal to generate the phase difference signal and a low pass filter filters the phase difference signal.

An embodiment of a method, according to the present invention, for automatically adjusting a switching voltage regulator circuit to account for an external component calls for measuring a phase of a ripple signal caused by the external component, generating a reference signal, and comparing the measured phase of the ripple signal to the reference signal to obtain a phase difference signal. The method then calls for adjusting a transfer function of a feedback path of the switching voltage regulator responsive to the phase difference signal to obtain stable operation of the switching voltage regulator circuit. In a further refinement of this embodiment, the step of adjusting a transfer function of a feedback path further includes converting the phase difference signal to a variable characteristic control signal and adjusting a variable characteristic in the feedback path of the switching voltage regulator responsive to the variable characteristic control signal. In still another refinement of this embodiment, the step of adjusting a variable characteristic in the feedback path of the switching voltage regulator responsive to the variable characteristic control signal further comprises adjusting a variable capacitance in the feedback path responsive to the variable characteristic control signal. Another embodiment of the method further calls for measuring an amplitude of the ripple signal. This embodiment then calls for converting the phase difference signal and the measured amplitude of the ripple signal into a second variable characteristic control signal and adjusting the transfer function of the feedback path of the switching voltage regulator responsive to the second variable characteristic control signal to improve a transient response of the switching voltage regulator circuit. In a further refinement of this embodiment, the step of adjusting the transfer function of the feedback path of the switching voltage regulator responsive to the second variable characteristic control signal to improve a transient response of the switching voltage regulator circuit further includes adjusting a gain in the feedback loop responsive to the second variable control signal and introducing at least one of a second pole or zero to the transfer function responsive to the second variable control signal.

BRIEF DESCRIPTION OF DRAWINGS

The present invention is described herein with reference to the accompanying drawings, in which like numerals designate corresponding parts in the figures, wherein.

DETAILED DESCRIPTION OF PREFERRED EMBODIMENTS

The present invention is directed to a system and method for automatic stability control of a switching voltage converter.

Figure 1:
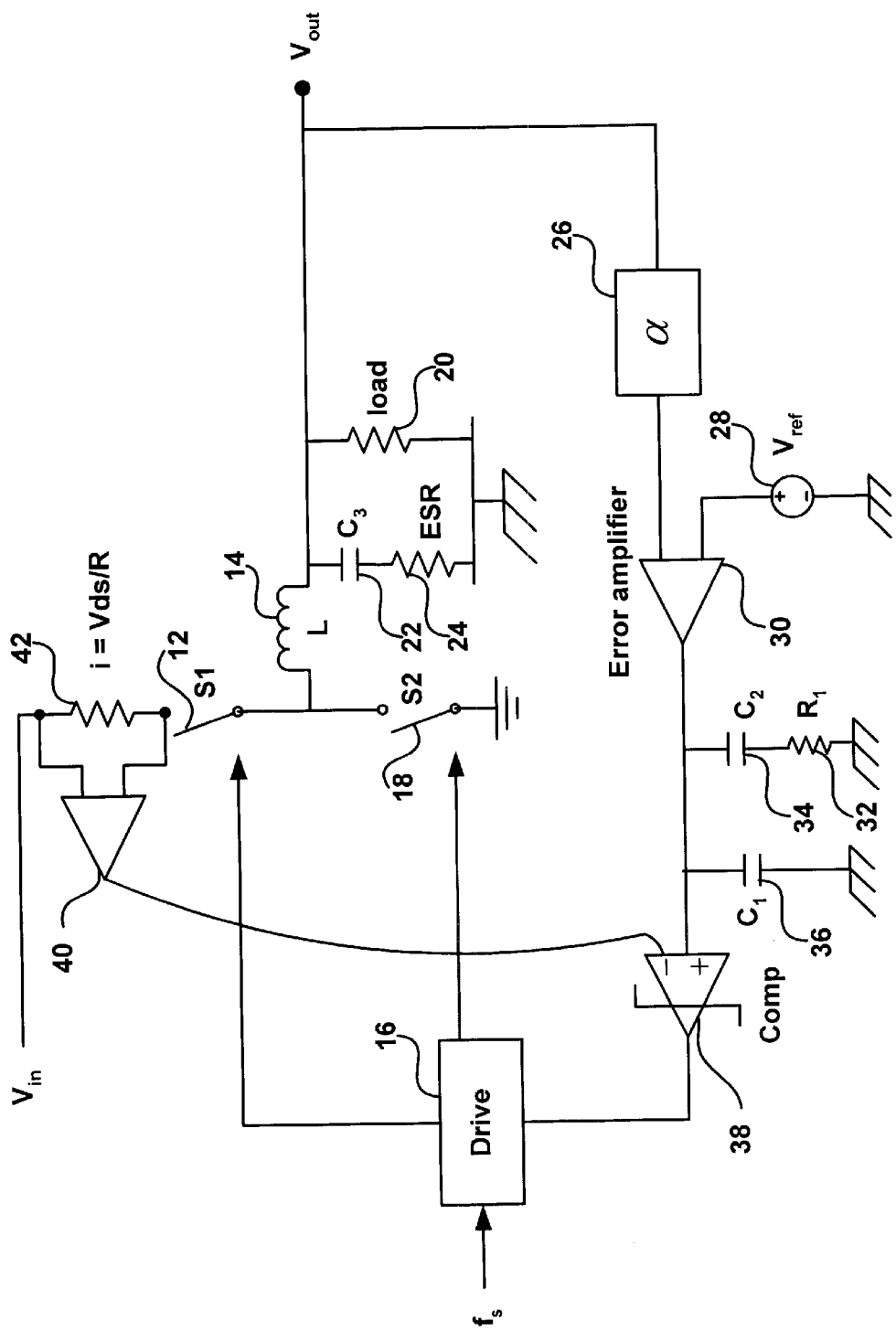
FIG. 1 is a functional block diagram illustrating an embodiment of a switching voltage regulator according to the present invention.
Figure 2:
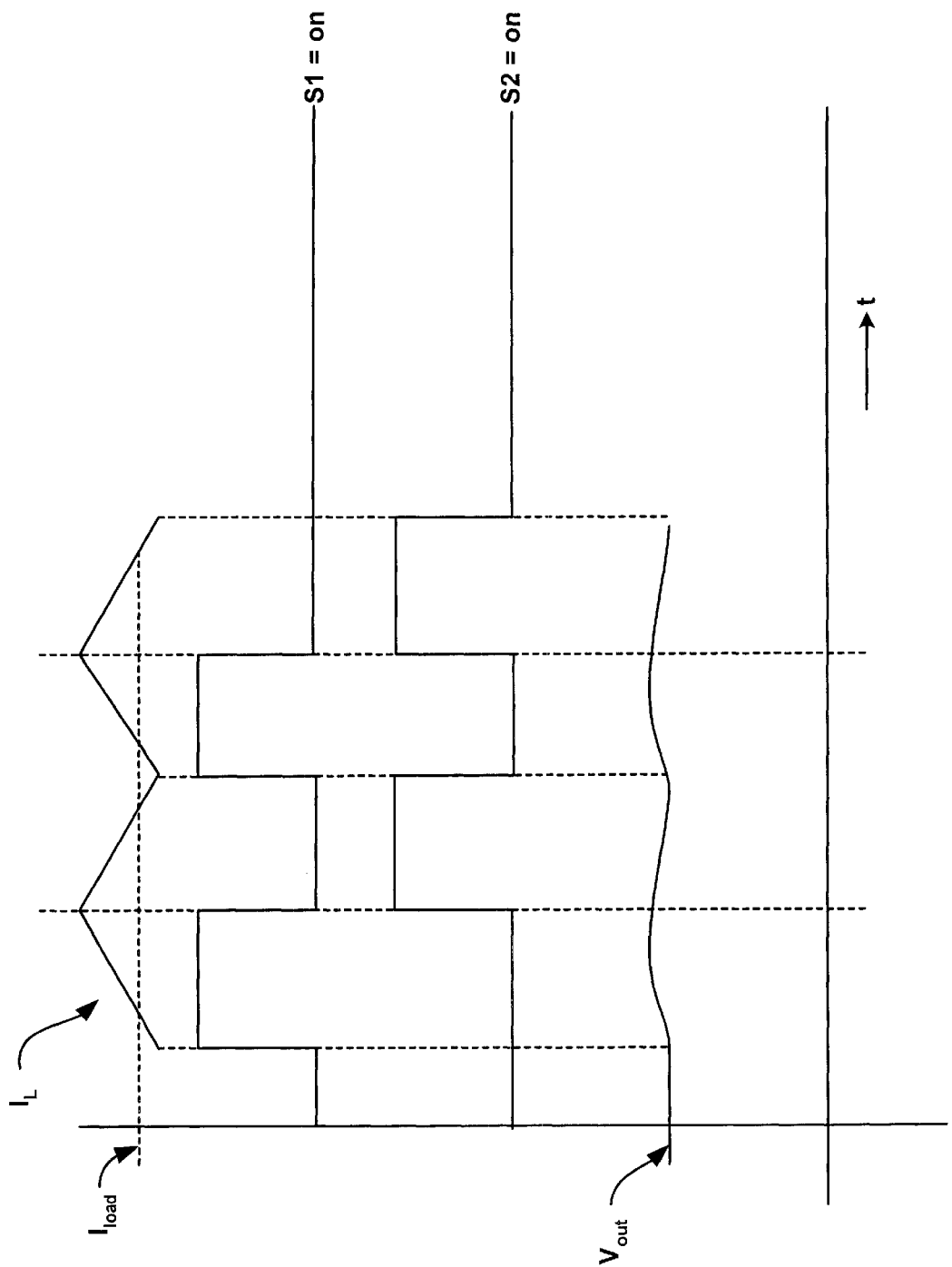
FIG. 2 is a waveform diagram illustrating the operation of the switching voltage regulator of FIG. 1.

FIG. 1 is a diagram illustrating an embodiment of a voltage regulator suitable for use with the present invention, where the regulator has a Buck topology. A first switching device S1 12 couples an input $V_{in}$ to one end of an inductor L 14 under control of a drive circuit 16. A second switching device S2 18 couples the end of inductor L 14 to ground also under control of the drive circuit 16. The drive circuit 16 closes switches S1 12 and S2 18 as shown in the waveform of FIG. 2 and is driven by a clock signal having a set switching frequency $f_S$ that is provided by an oscillator (not shown). Switching devices S1 12 and S2 18 are typically implemented as MOSFET devices, but may also be implemented using other forms of switches and even bipolar transistors or diodes may be used in some applications.

The other end of inductor L 14 is coupled to an output $V_{out}$ of the voltage regulator. Coupled to the output Vout are a load resistor 20 and a capacitor $C_3$ 22 having an equivalent series resistance (ESR) 24, where $C_3$ 22 is typically an external component and the ESR 24 is a parasitic resistance in series with the capacitor $C_3$ 22. The output is coupled to a gain unit 26 that applies a gain of a to the output voltage. The gain unit 26 is typically a resistive divider that divides the output voltage proportional to the reference voltage $V_{ref}$ 28 that is input to the error amplifier 30. An example of a generator that may be used to produce reference voltage $V_{ref}$ 28 is a bandgap voltage generator. The gain unit 26 is selected to scale the magnitude of desired output voltage at $V_{out}$ to the reference voltage $V_{ref}$ 28 used by the circuit. For example, if the desired output voltage is two volts and the reference voltage is 1 volt, then α is selected to be 0.5.

The error amplifier 30 compares the adjusted output voltage to the reference voltage $V_{ref}$ 28 to produce an error signal that reflects a difference between the output voltage and the reference voltage. The error signal is filtered by a filter $R_1$ 32, and $C_2$ 34 and also by capacitor $C_1$ 36. The filtered error signal is then input to a comparator 38 that compares the filtered error signal to a sampled input current signal obtained from a sampling amplifier 40. The sampling amplifier 40 samples the input current signal by measuring the voltage drop $V_{RS}$ across a sense resistance 42, which, in one embodiment, is an inherent resistance of the MOSFET device that implements switch device S1 12. The $V_{RS}$ voltage is buffered and amplified by the sampling amplifier 40 and then input to the comparator 38. The output of the comparator 38 provides the input to the drive circuit 16 that controls the switching of switch devices S1 12 and S2 18.

The path from the output $V_{out}$ through the error amplifier 30 and the filter formed by resistor 32, capacitor 34 and capacitor 36 is a feedback path. The feedback path has a transfer function determined by the gain of error amplifier 30 and the filter formed by resistor 32, capacitor 34 and capacitor 36. The feedback path closes a feedback loop through switches S1 12 and S2 18 and the inductor L 14 to $V_{out}$.

The stability of the PWM voltage converter circuit of FIG. 1 is determined by the elements in the feedback loop. These elements include the inductor L 14, the output capacitor $C_3$ 22, the ESR 24 of $C_3$ 22, and the load resistance 20, all of which are typically external components and, therefore, are not under the control of the designer of a PWM integrated circuit. Typically, a high quality capacitor having a very low ESR 24 is specified for $C_3$ 22, which typically results in $C_3$ 22 being an expensive component. Also, the capacitor may deteriorate resulting in an increased value for the ESR 24 and may also cause the PWM circuit's performance to deteriorate or even fail. Circuit elements $C_1$ 36, $C_2$ 34, $R_1$ 32, the α of the resistive divider 26, the gain of the error amplifier 30 and the gain of the sampling amplifier 40 are also often determined using external components. Some of these components may be integrated into a chip containing the PWM circuit, though this may result in strict tolerances being imposed for these components in order to preserve stability of the PWM converter circuit. The present invention allows more circuit elements, such as one or more of $C_1$ 36, $C_2$ 34, $R_1$ 32, the α of the resistive divider 26, the gain of the error amplifier 30 and the gain of the sampling amplifier 40, to be integrated into a single integrated circuit that automatically adjusts to the tolerances of the external devices, such as $C_3$ 22.

Figure 3B:
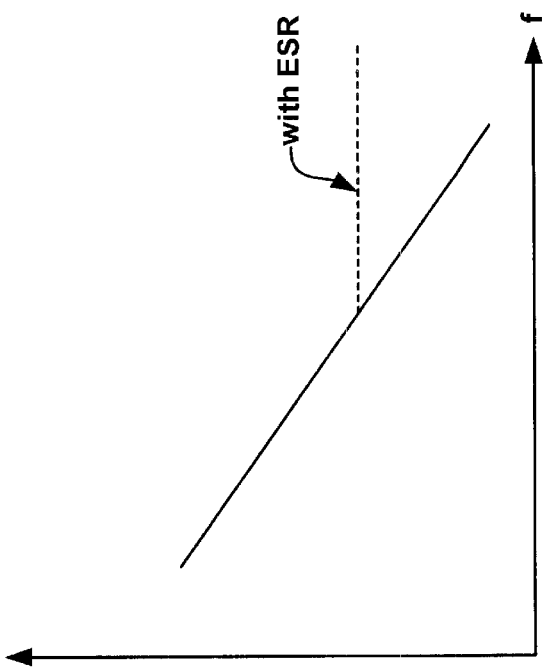
FIG. 3B is an open loop frequency response diagram of the voltage regulator circuit of FIG. 1 with the current control loop closed illustrating an example of the frequency response due to the effect of an equivalent series resistance in the switching voltage regulator of FIG. 1.
Figure 3A:
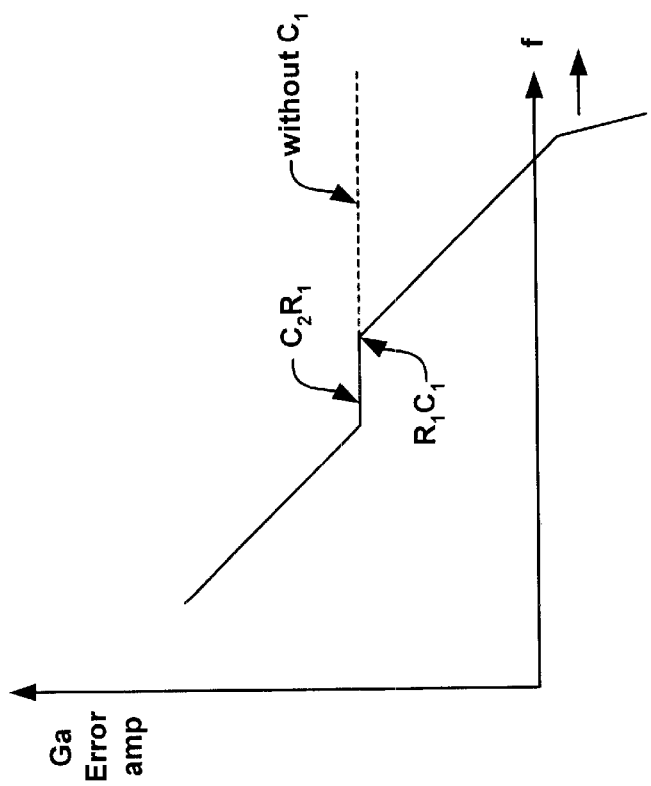
FIG. 3A is a frequency response diagram illustrating an example of the frequency response of the error amplifier of the switching voltage regulator of FIG. 1.

FIGS. 3A and 3B are Bode diagrams that illustrate the frequency response of different portions of the feedback loop of FIG. 1. FIG. 3A represents the gain and frequency response of the error amplifier with the poles and zero introduced by $C_1$, $C_2$, and $R_1$. A first pole is produced by $C_2$. A zero is introduced by the combination of $C_2$ and $R_1$. A second pole is introduced by $R_1$ and $C_1$ when $C_1$ is introduced to the feedback loop. The dotted line portion of the Bode diagram of FIG. 3A illustrates the frequency response in the absence of $C_1$.

FIG. 3B represents the "open loop" gain and frequency response of a voltage control feedback loop of the PWM converter circuit of FIG. 1 when the current control loop is closed and the ESR is present at the output $V_{out}$, but the voltage control feedback loop is open. The current control loop runs from sense resistance 42 through sense amplifier 40 and comparator 38 to drive circuit 16 and back to switches S1 12 and S2 18, which control the current through the sense resistance 42. The voltage control feedback loop runs from output $V_{out}$ through scaling circuit 26 to error amplifier 30, through the filters formed by capacitor 34 and resistor 32 along with capacitor 36 to comparator 38, and from the comparator 38 through drive circuit 16 to switches S1 12 and S2 18, which produce the output voltage at $V_{out}$. Note that the gain decreases until a zero introduced by the ESR is introduced, where the gain levels off. In the absence of the pole introduced by $C_1$ 36 to the error amplifier response of FIG. 3A, the gain in FIG. 3B would increase with the introduction of ESR resulting in an unstable PWM circuit response. Due to the pole introduced by $C_1$ 36, a 6 decibel (dB) per octave roll-off at 0 dB yields a 90° phase margin and results in a stable circuit.

In one embodiment of a PWM circuit according to the present invention, $C_1$ 36 is adjusted to compensate for the parasitic ESR value that is present in the external capacitor $C_3$ 22. In another embodiment of the present invention, in order to provide a stable frequency response, the loop bandwidth is adjusted to obtain a good load transient response while at the same time compensating for the ESR 24 by adjusting the value of $C_1$ 36. In conventional devices, $C_1$ 36 is typically either fixed by the value chosen for the design and the maximum ESR of $C_3$ 22 must be specified or the value of $C_1$ 36 is manually set when the converter circuit is assembled. For further information concerning AC signal analysis of PWM switches see Daniel Mitchell in *DC-to-DC Switching Response Analysis,* 1988, McGraw-Hill, herein incorporated by reference.

In one embodiment of the present invention, the PWM circuit determines the ESR value electronically and automatically adjusts the value of capacitance $C_1$ 36 to compensate for the ESR of external capacitor 22. In order to compensate for the ESR, the PWM circuit monitors the phase of the ripple voltage. FIG. 2 illustrates the ripple signal introduced in the output voltage by the ESR. The ripple at Vout occurs largely due to the presence of ESR 24. The ripple may be between 0° and 90° out-of-phase due to the ratio between the ESR 24 and the capacitance of $C_3$ 22. A control circuit converts the measured phase difference signal into a control signal for adjusting capacitance $C_1$ 36 to introduce a zero to the transfer function of the voltage control feedback loop. Introducing the zero to the transfer function to compensate for the ESR 24 of external capacitor 22 obtains stable operation of the PWM circuit.

In another embodiment of the present invention, the PWM circuit is configured to automatically improve the bandwidth of the circuit by controlling the gain of error amplifier 30 in the feedback loop and adjusting the capacitance $C_2$ of capacitor 34. In this embodiment, the PWM circuit monitors both the amplitude and phase of the ripple signal present at the output Vout. From these measurements, the gain of error amplifier 30 and capacitance $C_2$ 34 in the voltage control feedback loop may be adjusted to optimize bandwidth response of the PWM circuit. Adjusting the gain of amplifier 30 improves the bandwidth response of the feedback loop, but capacitance $C_2$ must be adjusted in combination with the gain to properly position a pole in the transfer function of the voltage control feedback loop for optimal transient response.

Figure 4:
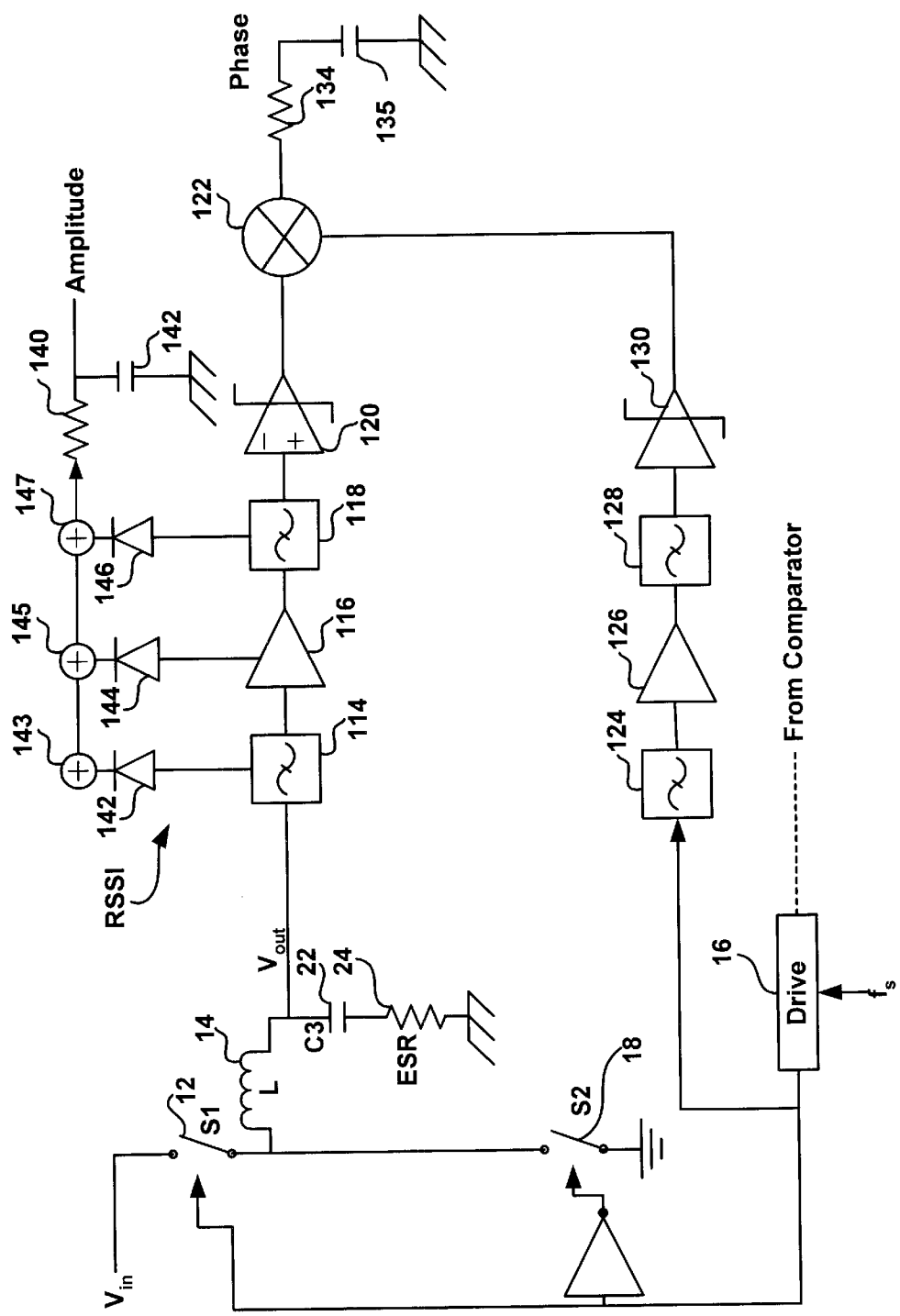
FIG. 4 is a functional block diagram illustrating an embodiment of a measuring circuit according to the present invention for measuring the amplitude and phase of the ripple signal at Vout of FIG. 1.

FIG. 4 illustrates an embodiment of a measuring circuit according to the present invention for measuring the amplitude and phase of the ripple signal at $V_{out}$. In this embodiment, a pair of intermediate frequency (IF) strip circuits similar to those found in radio receivers are used to obtain the phase of the ripple signal. The embodiment shown in FIG. 4 includes an optional circuit similar to a Radio Signal Strength Indicator (RSSI) circuit that sums portions of one of the IF strips and is used to detect the amplitude of the ripple signal. For further information regarding IF and RSSI circuits, see LOG-AMP design, chapter 9, in the 1992 Amplifier Applications Guide, Analog Devices, ISBN-0-916550-10-9, herein incorporated by reference in its entirety for all purposes. The measuring circuit includes several strip sections, where each section may include a combination of multiple bandpass filters and amplifiers. In one embodiment, a first strip section includes a first bandpass filter 114, an amplifier 116, a second bandpass filter 118 and a limiter 120 coupled between $V_{out}$ and an input of a multiplier 122. The first strip section derives the phase of the ripple at $V_{out}$. A second strip section includes a first bandpass filter 124, an amplifier 126, a second bandpass filter 128 and a limiter 130 coupled between the output of the drive circuit 16, e.g. the switching signal for switches S1 12 and S2 18, and another input of the multiplier 122. The second strip section provides a reference signal for comparison to the measured ripple at $V_{out}$ provided by the first strip section. The multiplier 122 effectively compares the measured phase of the ripple voltage to the reference signal to output a phase difference signal that drives a low-pass filter formed by a resistor ESR 24 and capacitor C3 22. The frequencies of the bandpass filters are centered substantially around the switching frequency $f_s$ of the PWM switching circuit.

The components of the first strip section may also be tapped to generate an amplitude signal reflecting the amplitude of the ripple signal at $V_{out}$. The output of each of the first bandpass filter 114, the amplifier 116, and the second bandpass filter 118 of the first strip section are added together by a series of adders that drive a series resistor 140 and capacitor 142 to produce the amplitude signal. The circuit used to generate the amplitude resembles an RSSI circuit.

Figure 8:
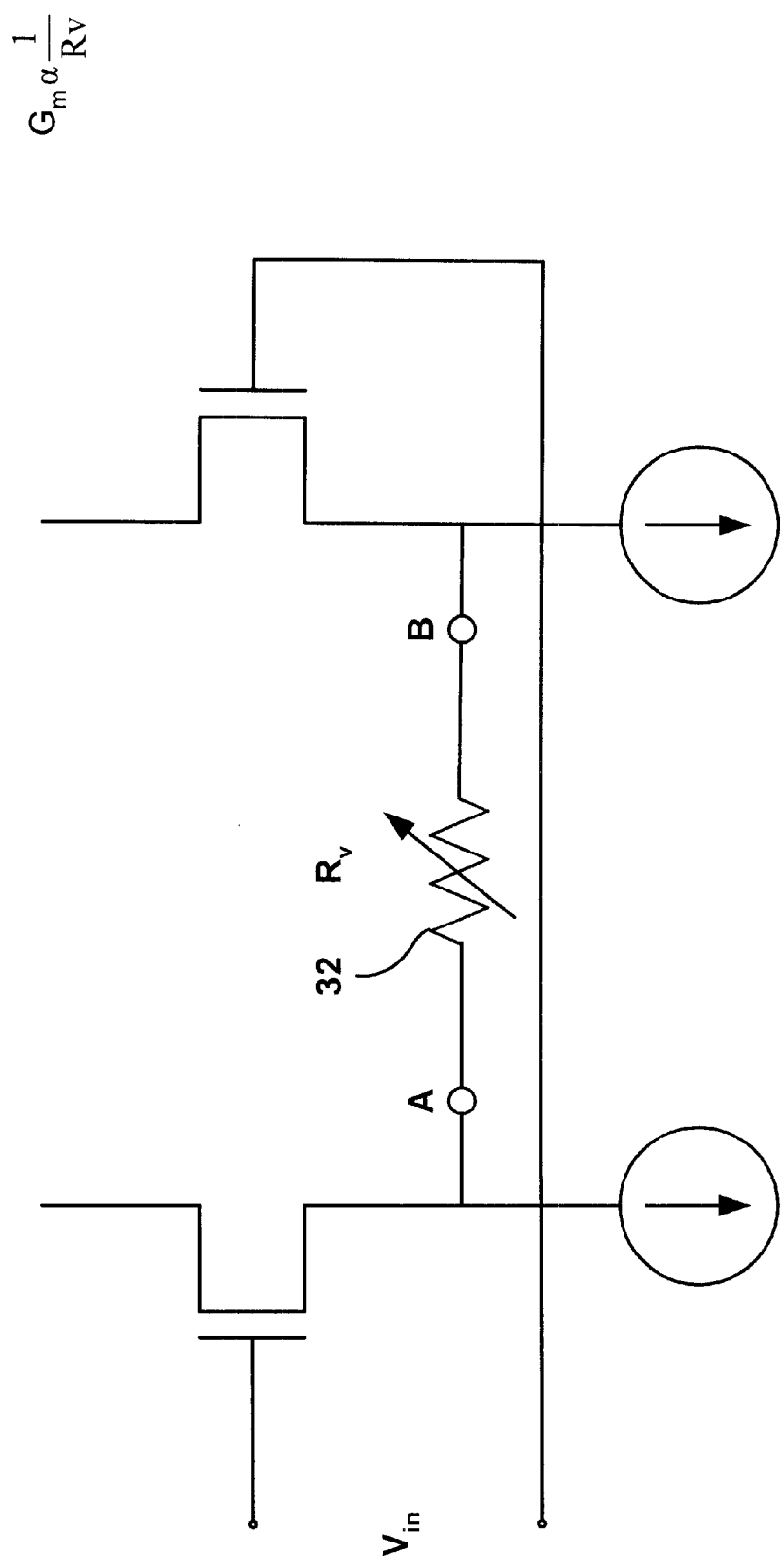
FIG. 8 is a circuit diagram illustrating a portion of one embodiment of the error amplifier of FIG. 1 adapted to include the variable resistance of FIG. 5, which determines the gain of the error amplifier under control of the control circuit of FIG. 5.

The amplitude and phase difference signals are then converted into control signals the control the transfer function of the voltage control feedback loop. In the present invention, the transfer function of the error amplifier 30 may be controlled by adjusting the one or more of $C_1$, $C_2$, $R_1$, and the gain of the error amplifier. In one embodiment, $C_1$ 36 is an adjustable capacitance that is varied in response to the measured phase difference signal generated by the measuring circuit of FIG. 4. In another embodiment of the present invention, error amplifier 30 includes an adjustable resistance, as illustrated in FIG. 8, that determines a gain Gm of the error amplifier and that is controlled to change the transfer function of the error amplifier and $C_2$ is an adjustable capacitance that is controlled to accommodate the change in the gain Gm.

By way of example, the transfer function for the error amplifier 30 may be calculated as follows. In the following equation (1), K(f) represents the transfer function of the error amplifier and $K_{opt}$ represents the optimum gain of the error amp without the filter produced by the introduction of $C_1$ and $C_2$, e.g. (Gm*$R_1$).

$$K(f)=[K_{opt}(1+j*(f/f_{corner}))]/[f/f_{corner})*(1+jf/f_{corner}2)] \qquad (1);$$

where $f_{corner}$ is the first pole at $C_2*R_1$ and $f_{corner}2$ is the pole at $C_1*R_1$. Equation (2) demonstrates a formula that may be used for $f_{corner}$ and $f_{corner}2$.

$$f_{corner}=fn/3, \text{ where } fn=1/(2*\pi*\sqrt{(L*C_3)}) \qquad (2).$$

Furthermore, equation (3) below demonstrates a formula that may be used to optimize the error amplifier gain in order to optimize bandwidth:

$$K_{opt}=2*fs*Rs*C_3/\alpha \qquad (3);$$

where α is the gain of the resistive divider, fs is switching frequency, Rs is the transimpedance of the I to V converter (e.g. the sampling amplifier) used to measure the current across switch S1 12 in the converter measurement circuit A, and $C_3$ 22 is the value of the output capacitor. Thus, the gain Gm and $f_{corner}$ can be set if the output capacitor value of $C_3$ is known.

The pole $f_{corner}2$ can be calculated, for example, using equation (4) below:

$$f_{corner}2=(f_S/10)*\{10^{**}[(1-2*phase/\pi)*2]\} \qquad (4);$$

which is an approximation of:

$$f_{corner}2=1/(2*\pi*R_{ESR}*C_3) \qquad (5).$$

Thus phase, which is measured and known, can be set for the $f_{corner}2$ pole. If only the phase value is available, then it is possible to compensate for the ESR, e.g. RESR, but not to set the gain and the first zero. This requires the amplitude measurement be obtained.

The formulae above indicate that Rs, $C_3$, α and L must be known in order to set the transfer function of the converter circuit. However, by rearranging the formulae above, it is possible to obtain expressions based upon the measured parameters of the amplitude and phase of the ripple voltage along with the value of $f_S$ and $V_{RS}$, the voltage across the sense resistance Rs. $V_{RS}$ is basically a known value for the circuit design. Thus, according to the present invention, the Kopt, fcorner and fcorner2 may be derived from the measured amplitude and phase measurements.

In current controlled voltage converters, e.g. current limited converters, $V_{RS}$ may be taken as $(1/3)V_{LIM}$, where $V_{LIM}$ sets the current limit of the converter and is typically in the range of 100 to 150 mV. Higher values for $V_{LIM}$ may adversely affect the efficiency of the converter. Since $V_{LIM}$ is set for the circuit, $V_{RS}$ will be a known value, e.g. 50 mV. Under this assumption, the following formulae may be obtained:

ti $K=(V_{RS}/V_{amplitude\ in})*[tan(phase)+1]/4+tm$ (6);

$$f_{corner}=f_S*\sqrt{(2*phase)}/\sqrt{[(1-D)*K*1.24*2*\pi]} \qquad (7);$$

and $$f_{corner}2=(f_S/10)*\{10^{**}[(1-2*phase/\pi)*2]\} \qquad (8).$$

where phase is in radians and D is duty cycle, which may be expressed as $f_S$ (time S1 is closed)=(Vout/Vin). Note that the duty cycle is known for the chip design and is available from the output of comparator 38. After the calculation of (6),(7) and (8), the values for C1, C2, Gm follow by using a selected value of R1, which yields equations (9), (10) and (11) below.

$$K=Gm*R1 \qquad (9)$$

$$f_{corner}=1(2\pi*C_2R_1) \qquad (10)$$

$$f_{corner}2=1(2\pi*C_1R_1) \qquad (11)$$

Note that, because there are four variables and three equations, a similar result may be obtained by selecting a fixed value for one of the other parameters. For example, a small fixed value of $C_2$ may be selected and $R_1$ and $C_1$ varied. Also, $C_1$ may be fixed and Gm, $R_1$ and $C_2$ calculated. $R_1$ is selected to be a fixed value here because it is somewhat easier to then adjust Gm and $C_1$. There is thus a degree of freedom in the design of the PWM circuit according to the present invention without departing from the teachings of the present invention.

Note from equation (7) and (9) above that Gm and $C_2$ must both be adjusted to optimize the bandwidth of the transient response of the voltage control feedback loop. Higher bandwidth yields a better transient response for the circuit. However, if the gain Gm becomes too high, then the circuit may become unstable. It is generally desirable that bandwidth response be in the range of $(1/3)f_S$ to $(1/10)f_S$. When Gm is adjusted, then K changes, as is seen in equation (9). This causes $f_{corner}$ to shift, as is seen in equation (7). From equation (10), it can be seen that $C_2$ may be adjusted to compensate for the change in Gm and to position $f_{corner}$ for improved transient response.

These formulae may be implemented by a processor, such as a digital signal processor (DSP), or using analog to digital (A/D) converters in combination with an analog look-up table. For example, a four bit A/D converter may be used to implement sixteen discrete values.

Figure 5:
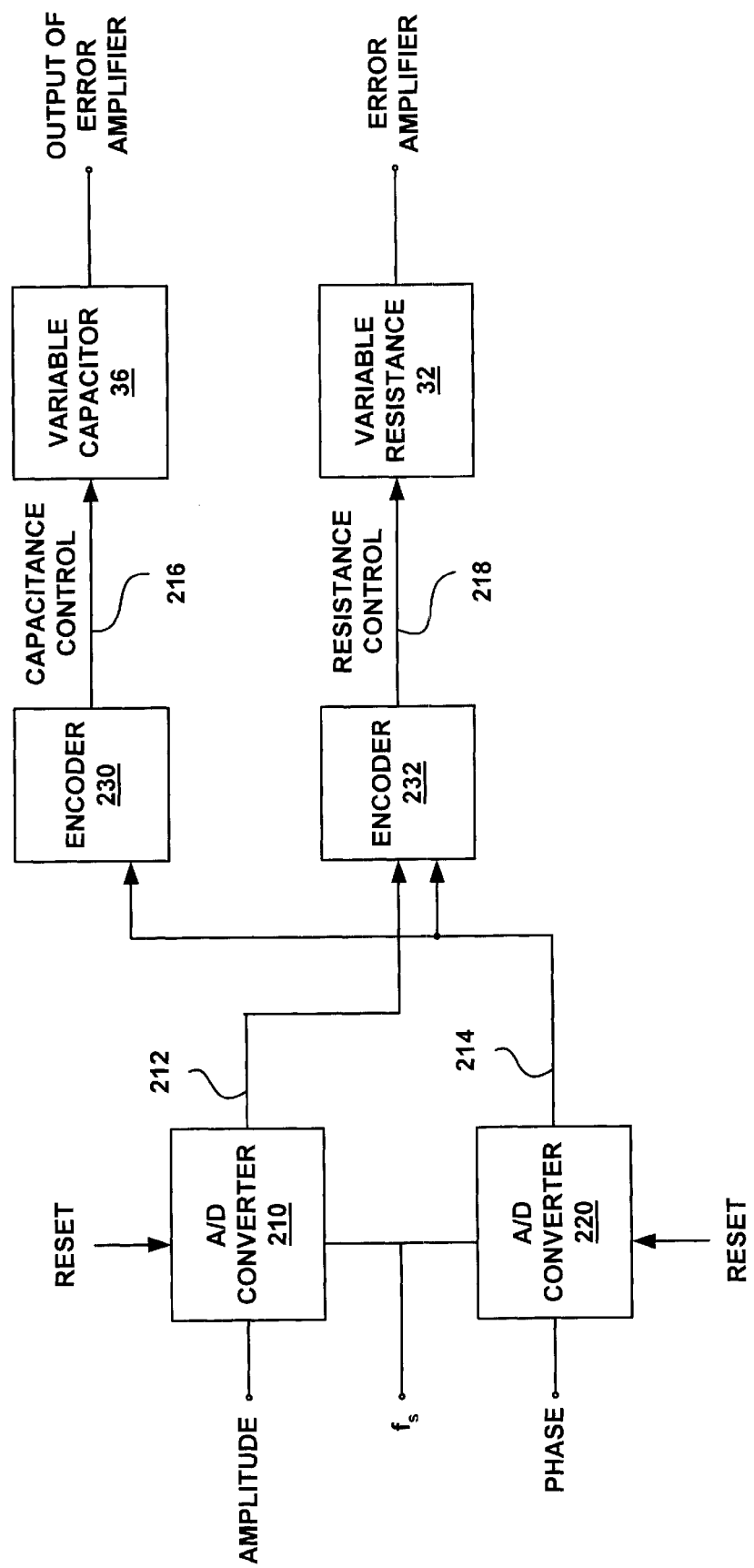
FIG. 5 is a functional block diagram illustrating an embodiment of a control circuit according to the present invention that receives the analog amplitude and phase difference signals from the measuring circuit of FIG. 4 and generates a capacitance control signal for controlling a variable capacitance C1 of FIG. 1 and a resistance control signal for controlling a variable resistance that controls the gain of the error amplifier of FIG. 1.
Figure 6:
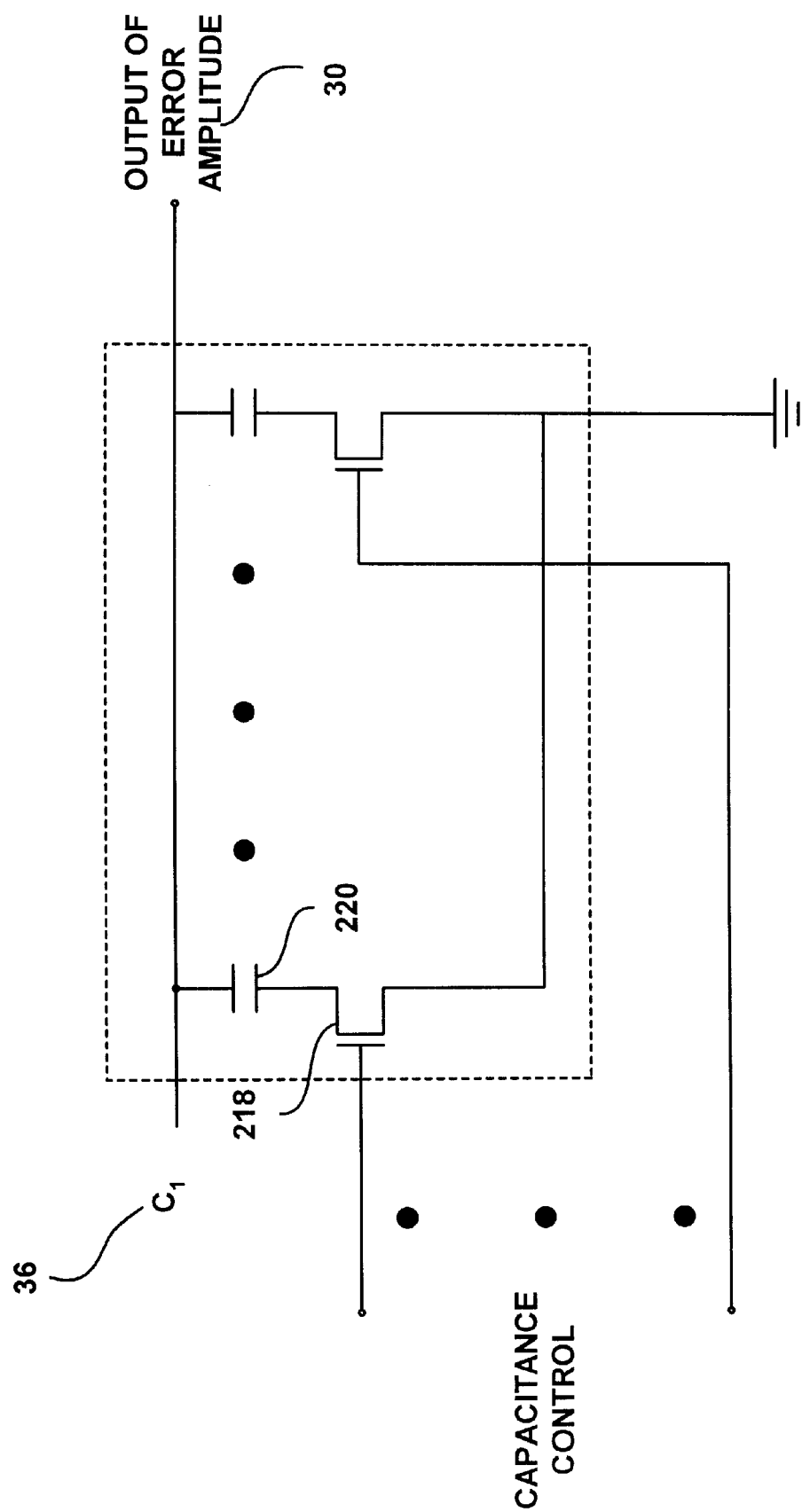
FIG. 6 is a functional block diagram illustrating an embodiment of variable capacitance C1 of FIG. 1 and FIG. 5.

FIG. 5 illustrates one embodiment of a control circuit that converts the analog amplitude and phase difference signals output by the measuring circuit of FIG. 4 into capacitance and resistance control signals that control the variable capacitance $C_1$ of variable capacitance element 36 and a variable resistor element in error amplifier 30 that determines the gain of the error amplifier. The control circuit of FIG. 5 utilizes a first Analog to Digital (A/D) converter 210 to convert the analog amplitude signal 212 into a digital value that is output to a capacitance encoder 230 and a resistance encoder 232. The capacitance encoder 230 encodes the digital value for the amplitude signal output by the first A/D converter 210 to generate a digital capacitance control signal 216. The digital capacitance control signal 216 drives variable capacitance 36 coupled to the output of error amplifier 30. One embodiment of variable capacitance element 36 is illustrated in FIG. 6, where the digital capacitance control signal drives an array of transistors 218 coupled in series with an array of capacitors 220 to vary the adjustable capacitance $C_1$ 36 coupled to the output of the error amplifier 30. The digital capacitance control signal 216 selectively activates or deactivates the transistors of variable capacitance $C_1$ to add or remove the capacitance of the individual capacitors of variable capacitance element 36 to the PWM voltage converter circuit transfer function thereby adjusting the variable capacitance $C_1$ of variable capacitance element 36. In some embodiments of the present invention, capacitance C2 may be a variable capacitance that is implemented in a manner similar to the implementation of variable capacitance element 36.

The control circuit of FIG. 5 utilizes a second Analog to Digital (A/D) converter 220 to convert the analog phase difference signal 214 into a digital value that is output to the capacitance encoder 230 and the resistance encoder 232. The capacitance encoder 230 may use the digital value for the phase difference signal output by the first A/D converter 210 to generate the digital capacitance control signal 216. The resistance encoder 232 uses the digital values for the amplitude and phase difference signals output by the first and second A/D converters 210 and 220 to generate the digital resistance element within the error amplifier 30 that determines the gain Gm of the amplifier. An example of the variable resistance element disposed within a portion of the error amplifier 30 is illustrated in FIG. 8, which shows the variable resistance element disposed between the sources of a differential pair of transistors. The gain Gm is inversely proportional to the value of the variable resistance.

Figure 7:
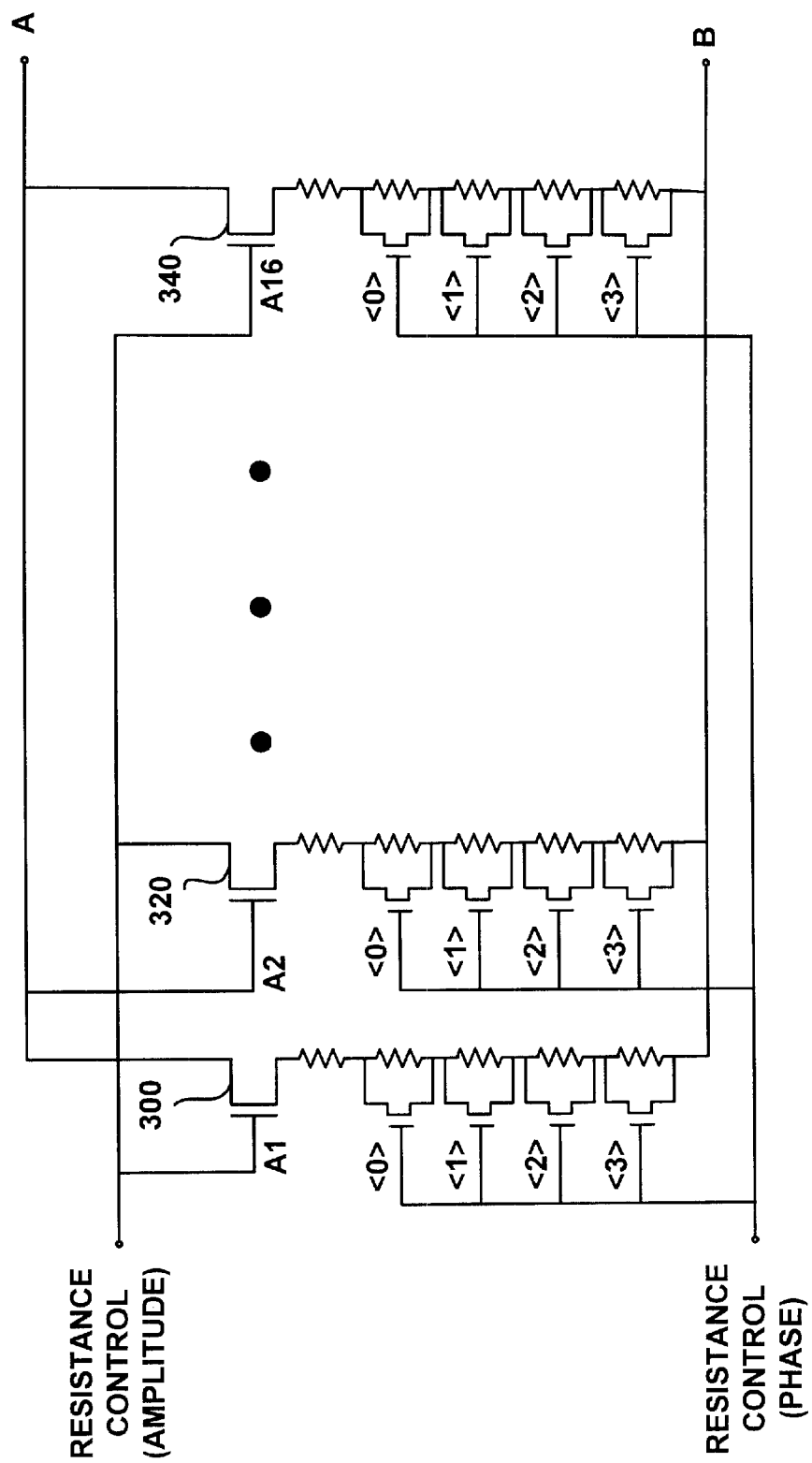
FIG. 7 is a functional block diagram illustrating an embodiment of the variable resistance of FIG. 5, where the variable resistance operates as an analog look-up table implementing a stability formula.

FIG. 7 illustrates one embodiment of the variable resistance element of FIG. 5. The variable resistance circuit of FIG. 7 includes a first array of transistors 300, where each transistor of the first array is coupled in series with, in this embodiment, a series of five resistors. Each column includes a second array of transistors 320 that selectively bypasses four of the five resistors in the column. The first array of transistors 300 is driven by an amplitude portion of the resistance control signal 218 that, in this embodiment, selects one column of resistors to produce the variable resistance 32. In this embodiment the resistance encoder selects one of sixteen lines to activate so that one of the column values A1 through A16 is active. The resistors in each of the columns is scaled relative to the next column such that selecting, for example the second column results in twice the resistance as the first column and selecting the third column results in three times the resistance of the first column. The second array of transistors 320 is driven by a phase portion of the resistance value, where the resistance within the column is determined by, in this embodiment, the four bit value of the phase portion of the resistance control signal 218. In this embodiment, the variable resistance element implements the [tan(phase)+1]/4 of equation (6) above. The circuit of FIG. 7 is a two dimensional array controlled by transistors driven by the resistance control value. The resistance values of FIG. 7 are selected to implement the function (6), (7) and (8) above. In effect, the variable resistance of FIG. 7 operates as an analog look-up table that selects a resistance in accordance with the resistance control value in order to adjust Gm for stable operation of the switching converter circuit of FIG. 1.

For example, phase may be represented by the values (0, 1/16, 2/16, . . . π)*π/2, which may be viewed as values A0 through A17. In one embodiment, the resistance value needed to implement the tan(phase) factor to set the value of K for $f_{corner}$ in equation (7) above may be scaled in accordance with the following table:

TABLE 1

| index | value |
| --- | --- |
| A1 | 0 |
| A2 | 0.098 |
| A3 | 0.199 |
| A4 | 0.303 |
| A5 | 0.414 |
| A6 | 0.535 |
| A7 | 0.686 |
| . | |
| . | |
| . | |
| A17 | 1.633*10**16 |

In Table 1, some values need not be implemented based upon operating assumptions. Thus, A1 for the value 0 need not be implemented because a null resistance will not be needed. Likewise, the value for A17 is so large that it is effectively an open and will not be needed. The number of discrete values can be lowered to a number of values, e.g. sixteen, that may be implemented with the four bit A/D converter.

Similarly, the expression 10*{10**[(1−2*phase/π)*2} needed to implement $f_{corner}2$ in equation (8) above, may be implemented using resistors scaled according to Table 2 below:

TABLE 2

| index | value |
| --- | --- |
| A1 | 0.1 |
| A2 | 0.133 |
| A3 | 0.178 |
| A4 | 0.237 |
| A5 | 0.316 |
| A6 | 0.422 |
| A7 | 0.562 |
| . | |
| . | |
| . | |
| A17 | 10 |

Again, some entries in Table 2 may be eliminated in order to reduce the number of discrete values implemented to fall within the range controllable by a four bit A/D converter. As one of ordinary skill in the art will readily appreciate, the components of the variable capacitance of FIG. 6 and the variable resistance of FIG. 7 may be scaled to implement the functions above to automatically introduce a pole or a zero to the transfer function of the feedback loop in order to obtain stable operation.

As noted above, the converter circuit may be implemented in a variety of other ways. For example, a microprocessor may be utilized to analyze the amplitude 212 and phase 214 signals and generate the capacitance control signal 216. Also, the adjustable capacitance C1 36 may be implemented in a variety of ways, including a. series of capacitors having the approximately the same level of capacitance or a series of capacitors having increasing levels of capacitance. The goal of the conversion circuit is to set the error amplifier 30 gain and the $C_1/C_2/R_1$ value to compensate for the ESR introduced by external output capacitor $C_3$. Note that if there is no ESR, e.g. a very high quality output capacitor is used for $C_3$, then no capacitance may be necessary at $C_1$ 36.

It should also be noted that the amplitude and phase measurement at $V_{out}$ may be performed when the PWM voltage regulator circuit first starts up. At this point, because error amplifier 30 is clamped to a supply voltage level due to the low voltage level at $V_{out}$, the voltage control feedback loop is essentially open and the values of $C_1$, $C_2$, $R_1$, and Gm are not relevant to the operation of the circuit. A start-up period with the feedback loop open permits the value for capacitance $C_1$, $C_2$, $R_1$, and Gm, e.g. the transfer function of the voltage control feedback loop, to be determined before the loop is automatically closed at the termination of a start-up sequence. Typically, the circuit will start in open loop mode as a result of the output voltage being so low that the error amplifier 30 is clamped to the voltage of an internal power supply rail. The error amplifier will not begin to be effective until the voltage at Vout approaches its desired value. A circuit may also be provided to generate a Reset signal input to the A/D converters to be generated when Vout reaches approximately 90% of its desired value.

In another approach, the start-up sequence may be controlled by a soft start mechanism, e.g. software controlled, that provides for a sufficient period of time, e.g. approximately one hundred switching cycles of the drive circuit, to allow the PWM circuitry, such as the filters and A/D converter, to settle and permit the amplitude and phase values to be measured before loop closure. If a soft start approach is used, then it is easier to implement the A/D converters used in the control circuit of one embodiment of the present invention because the A/D converters are permitted a longer period of time to convert the analog signals to digital values. Further note that the A/D converters may be configured to begin conversion from an intermediate value at start-up. Also note that this mechanism may be configured to periodically repeat, in some applications, in order to compensate for variations in the ESR due to aging of the components and environmental factors.

In one embodiment, the Reset signal input to the first and second A/D converters 210 AND 220 of FIG. 5 may be driven by a power-on reset signal or another source of control input to cause the A/D converters 210, 220 to evaluate and set the values for the capacitance and resistance control signals 216, 218. In one embodiment, the A/D converters include latches to latch the digital values for the amplitude and phase difference signals. The A/D converters may also be configured to allow a predetermined number of clock cycles of switching clock signal $f_S$ to pass before latching to allow settling of components before loop closure. In such an embodiment, the A/D converters may include counters to count out the number of cycles, e.g. 8 to 10, or successive approximation A/D converters may be used that automatically latch the digital value when conversion is complete.

In one embodiment, the present invention contributes to stability and low ripple in a voltage regulator by adjusting the transfer function of a voltage control feedback loop of the voltage regulator to compensate for the characteristics of an external output capacitor. In this embodiment, a phase measurement of the ripple voltage at the output of the voltage regulator is made and used to automatically determine the value of the adjustable capacitance $C_1$ needed to stabilize the switching circuit. In accordance with the present invention, a control circuit according to the present invention automatically adjusts the transfer function of the voltage control feedback loop of the switching voltage regulator circuit to obtain stable operation of the circuit.

In another embodiment, the present invention balances stability of the voltage regulator circuit with the transient behavior and gain of the feedback loop. The adjustable capacitance compensates for the ESR to create stability in the switching control circuit of the voltage regulator and reduce the gain of the feedback loop at high frequencies. In this embodiment, amplitude and phase measurements of the ripple voltage at the output of the voltage regulator are made and used to automatically determine the value of the adjustable capacitance needed to stabilize the switching circuit. The gain of the error amplifier Gm and another adjustable capacitance $C_2$ are adjusted to improve the bandwidth of the transient response of the voltage regulator circuit.

In view of the wide variety of embodiments to which the principles of the present invention can be applied, it should be understood that the illustrated embodiments are exemplary only, and should not be taken as limiting the scope of the present invention. For example, a variety of circuit elements may be utilized to perform certain functions of the present invention. Also, the function of some circuit elements may be combined into a single device while the function of other circuit elements may be implemented so as to be performed by multiple devices. For example, while the embodiment discussed above controls the adjustable capacitance $C_1$ to provide stability and improve bandwidth for the PWM circuit, one of ordinary skill in the art will readily appreciate that adjustments to any one or a combination of $C_1$, $C_2$, $R_1$ and the gain of the error amplifier may also be employed to alter the transfer function of the error amplifier to compensate for ESR and improve bandwidth. Also, certain aspects of the embodiments shown, such as soft start, may be implemented alternatively in software, hardware, firmware or a combination thereof.

Also note that while the present invention is described in the context of a switching voltage regulator having a Buck topology, the teachings of the present invention may also be applied to other types of voltage regulators, such as boost converters and Buck-boost converters. While the equations for the transfer functions for these other types of regulators will be different, the automatic adjustment of the transfer function to obtain stability and/or improved transient response may be applied to these topologies.

The invention is not limited to the precise embodiments shown herein. Therefore, all embodiments that come within the scope and spirit of the following claims and equivalents thereto are claimed as the invention.

I claim:

1. A control circuit for a switching voltage regulator circuit, the control circuit comprising:

a measuring circuit having a first input terminal coupled to an output terminal of the switching voltage regulator circuit and a second input terminal coupled to an output of a switch drive circuit of the switching voltage regulator circuit, the measuring circuit being configured to generate a phase difference signal responsive to an output voltage signal at the output terminal of the switching voltage regulator circuit and an output signal of the switch drive circuit;

a transfer function control circuit having a first input terminal for receiving the phase difference signal, the transfer function control circuit being configured to generate a transfer function control signal responsive to the phase difference signal such that the transfer function control signal causes at least one of a first zero or pole to be introduced to a transfer function of a voltage control feedback loop of the switching voltage regulator circuit; and a variable characteristic element disposed in the current control feedback loop having a variable characteristic that varies responsive to the transfer function control signal.

2. The control circuit of claim 1, where:

the measuring circuit is further configured to generate an amplitude signal responsive to the output voltage level at the output terminal of the switching voltage regulator circuit;

the transfer function control circuit is further configured to generate the transfer function control signal responsive to the amplitude and the phase difference signals such that the transfer function control signal causes a second one of a zero or pole to be introduced to the transfer function of the voltage control feedback loop of the switching voltage regulator circuit; and the variable characteristic element is further configured to vary the variable characteristic to implement the second one of a zero or pole.

3. The control circuit of claim 2, where the transfer function control circuit further comprises:

a first analog-to-digital (A/D) converter configured to convert the amplitude signal to a digital amplitude signal;

a second analog-to-digital (A/D) converter configured to convert the phase difference signal to a digital phase difference signal;

a resistance encoder circuit configured to receive the digital amplitude signal and the digital phase difference signal and generate a resistance control signal; and where the variable characteristic element further comprises a variable resistance element having a variable resistance, the variable resistance being controlled by the resistance control signal.

4. The control circuit of claim 2, where the measuring circuit further includes a radio signal strength indicator (RSSI) circuit for generating the amplitude signal.

5. The control circuit of claim 1, where the transfer function control circuit further comprises:

a first analog-to-digital (A/D) converter configured to convert the phase difference signal to a digital phase difference signal;

a capacitance encoder circuit configured to receive the digital phase difference signal and generate a first capacitance control signal; and where the variable characteristic element further comprises a first variable capacitance element having a first variable capacitance, the first variable capacitance being controlled by the first capacitance control signal.

6. The control circuit of claim 5, where:

the measuring circuit is further configured to generate an amplitude signal responsive to the output voltage level at the output terminal of the switching voltage regulator circuit;

the transfer function control circuit further includes:

a second analog-to-digital converter configured to convert the amplitude signal to a digital amplitude signal, a second capacitance encoder circuit configured to receive the digital amplitude signal and the digital phase difference signal and generate a second capacitance control signal, a resistance encoder circuit configured to receive the digital amplitude signal and the digital phase difference signal and generate a resistance control signal; and where the variable characteristic element further includes a variable resistance element having a variable resistance, the variable resistance being controlled by the resistance control signal and a second variable capacitance element controlled by the second variable capacitance control signal.

7. The control circuit of claim 6, where at least one of the first variable capacitance element, the second variable capacitance element, and the variable resistance element further comprises an analog look-up array that implements a predetermined function.

8. The control circuit of claim 6, where the first and second A/D converters are each further configured to receive a reset signal and a switching frequency signal and, responsive thereto, latch the digital amplitude and phase difference signal values, respectively, after a predetermined number of cycles of the switching frequency signal.

9. The control circuit of claim 6, where the variable resistance element is further configured to control a gain of an error amplifier within the current control feedback loop of the switching voltage regulator circuit.

10. The control circuit of claim 1, where the measuring circuit further comprises:

a first strip section having an input terminal coupled to the first input terminal of the measuring circuit, where the first strip section is configured to generate a measured phase signal in response to the output voltage signal;

a second strip section having an input terminal coupled to the second input terminal of the measuring circuit, where the second strip section is configured to generate a reference signal responsive to a signal at the output of the switch drive circuit;

a multiplier configured to receive and multiply the measured phase signal and the reference signal to generate the phase difference signal; and a low pass filter configured to filter the phase difference signal.

11. A method for automatically adjusting a switching voltage regulator circuit to account for an external component, the method comprising the steps of:

measuring a phase of a ripple signal caused by the external component;

generating a reference signal;

comparing the measured phase of the ripple signal to the reference signal to obtain a phase difference signal; and adjusting a transfer function of a feedback path of the switching voltage regulator responsive to the phase difference signal to obtain stable operation of the switching voltage regulator circuit.

12. The method of claim 11, where the step of adjusting a transfer function of a feedback path further includes the steps of:

converting the phase difference signal to a variable characteristic control signal; and adjusting a variable characteristic in the feedback path of the switching voltage regulator responsive to the variable characteristic control signal.

13. The method of claim 12, where the step of adjusting a variable characteristic in the feedback path of the switching voltage regulator responsive to the variable characteristic control signal further comprises adjusting a variable capacitance in the feedback path responsive to the variable characteristic control signal.

14. The method of claim 11, where the step of adjusting a transfer function of a feedback path of the switching voltage regulator responsive to the phase difference signal further comprises introducing at least one of a pole or zero to the transfer function responsive to the phase difference signal.

15. The method of claim 11, the method further including the steps of:

measuring an amplitude of the ripple signal;

converting the phase difference signal and the measured amplitude of the ripple signal into a second variable characteristic control signal; and adjusting the transfer function of the feedback path of the switching voltage regulator responsive to the second variable characteristic control signal to improve a transient response of the switching voltage regulator circuit.

16. The method of claim 15, where the step of adjusting the transfer function of the feedback path of the switching voltage regulator responsive to the second variable characteristic control signal to improve a transient response of the switching voltage regulator circuit further comprises adjusting a gain in the feedback loop responsive to the second variable control signal and introducing at least one of a second pole or zero to the transfer function responsive to the second variable control signal.

17. An apparatus for automatically adjusting a switching voltage regulator circuit to account for an external component, the apparatus comprising:

means for measuring a phase of a ripple signal caused by the external component;

means for generating a reference signal;

means for comparing the measured phase of the ripple signal to the reference signal to obtain a phase difference signal; and means for adjusting a transfer function of a feedback path of the switching voltage regulator responsive to the phase difference signal to obtain stable operation of the switching voltage regulator circuit.

18. The apparatus of claim 17, where the means for adjusting a transfer function of a feedback path further includes:
   means for converting the phase difference signal to a variable characteristic control signal; and
   means for adjusting a variable characteristic in the feedback path of the switching voltage regulator responsive to the variable characteristic control signal.

19. The apparatus of claim 18, where the means for adjusting a variable characteristic in the feedback path of the switching voltage regulator responsive to the variable characteristic control signal further comprises means for adjusting a variable capacitance in the feedback path responsive to the variable characteristic control signal.

20. The apparatus of claim 17, where the means for adjusting a transfer function of a feedback path of the switching voltage regulator responsive to the phase difference signal further comprises means for introducing at least one of a pole or zero to the transfer function responsive to the phase difference signal.

21. The apparatus of claim 17, the method further including:
   means for measuring an amplitude of the ripple signal;
   means for converting the phase difference signal and the measured amplitude of the ripple signal into a second variable characteristic control signal; and
   means for adjusting the transfer function of the feedback path of the switching voltage regulator responsive to the second variable characteristic control signal to improve a transient response of the switching voltage regulator circuit.

22. The method of claim 21, where the means for adjusting the transfer function of the feedback path of the switching voltage regulator responsive to the second variable characteristic control signal to improve a transient response of the switching voltage regulator circuit further comprises means for adjusting a gain in the feedback loop responsive to the second variable control signal and means for introducing at least one of a second pole or zero to the transfer function responsive to the second variable control signal.

* * * * *